Sept. 2, 1924.
J. T. WELCH
FISHING REEL
Filed July 29, 1922
1,507,038
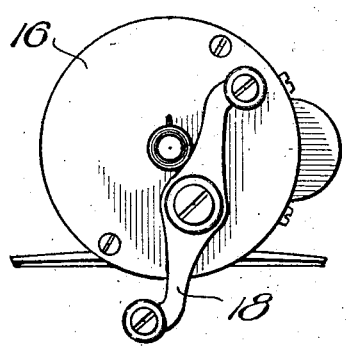
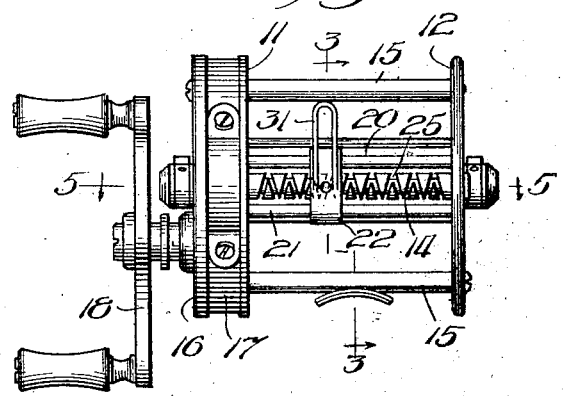
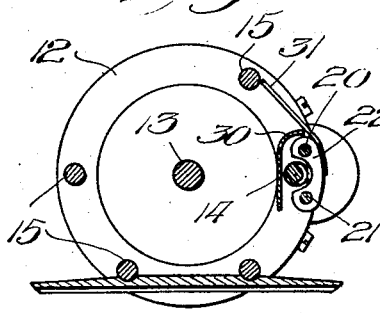
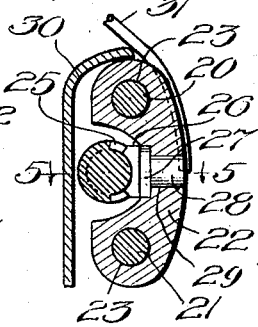
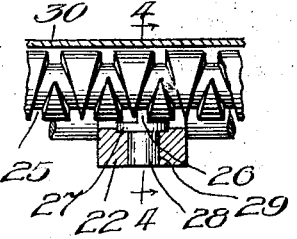
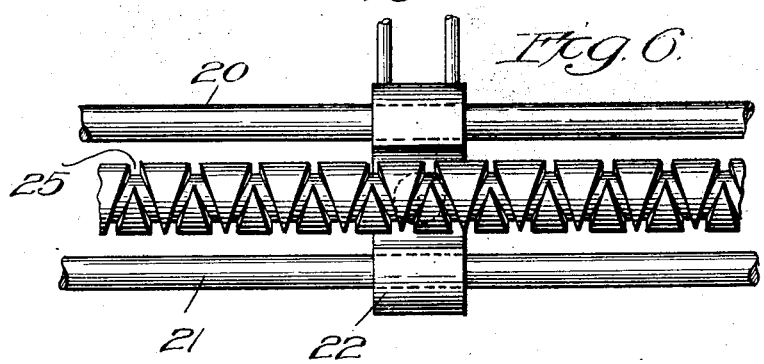

Patented Sept. 2, 1924.

1,507,038

UNITED STATES PATENT OFFICE.

JOHN T. WELCH, OF DOWAGIAC, MICHIGAN, ASSIGNOR TO JAMES HEDDON'S SONS, OF DOWAGIAC, MICHIGAN, A CORPORATION OF MICHIGAN.

FISHING REEL.

Application filed July 29, 1922. Serial No. 578,410.

*To all whom it may concern:*

Be it known that I, JOHN T. WELCH, a citizen of the United States, residing at Dowagiac, in the county of Cass and State of Michigan, have invented certain new and useful Improvements in Fishing Reels, of which the following is a specification.

This invention relates to a fishing reel with which is combined a level winding mechanism and is particularly concerned with the means which reciprocate and guide a carriage on which is mounted a guide for the line.

An exemplification of this invention is shown in the accompanying drawing in the manner following:

Figure 1 is an end elevation of a fishing reel;

Fig. 2 is a side elevation thereof;

Fig. 3 is a transverse section therethrough on line 3—3 of Fig. 2;

Fig. 4 is a transverse section through the carriage and associated parts taken on line 4—4 of Fig. 5;

Fig. 5 is a longitudinal section taken on line 5—5 of Fig. 4; and

Fig. 6 is an enlarged view in elevation looking toward the inner side of the carriage and parts associated therewith.

The principal parts of my reel include a pair of spaced head plates 11 and 12 between which are spool and traversing shafts 13 and 14, respectively, as well as the usual pillars 15. At one reel end is a cap 16 having flanged walls 17 which extend toward the proximate head plate so as to provide a chamber within which may be arranged driving connections that are set in motion through the medium of a crank 18.

Extending between the two head plates, and preferably equidistantly from the traversing shaft, are a pair of guides in the form of bars 20 and 21 on which a reciprocable carriage 22 is slidingly mounted. As viewed in cross section (see Fig. 4), the carriage is formed on its inner side with a hollow for the accommodation of the traversing shaft, the upper and lower ends of the carriage being extended, respectively, over and under the traversing shaft for a desired distance. In these end portions of the carriage are formed longitudinal openings running from one side of the carriage to the other to provide bearings through which the two guide bars are received. A carriage so mounted is free of the traversing shaft, its movements being controlled entirely by the two guide bars which serve both to prevent rotation as well as rocking of the carriage in the direction of its travel.

As is usual with level wind reels, a driving connection (not shown) leads from the crank 18 to the traversing shaft, so that the latter is rotated in response to movements of the former. In the traversing shaft are formed reversing threads 25 with which cooperate a pawl 26 that is provided with a head 27 from which is rearwardly extended a stem 28. In the central region of the carriage, preferably midway between the two guide bars, is a socket in the form of a cylindrical opening 29 whose axis is perpendicular to that of the traversing shaft, this opening providing a bearing in which is journaled the pawl stem 28. In this manner I provide in the carriage a mounting for the pawl such that it may freely oscillate as required for alignment with the threads of the traversing shaft, the pawl being loosely held in engagement therewith by the means described.

I prefer to associate with the carriage a guard or shield 30 so as to protect the line windings on the spool, and also mount on the carriage a line guide 31 which may take the form of a wire having a loop through which is passed the line. With rotation of the crank, the carriage is moved back and forth in the usual manner, and the line will accordingly be guided so as to wind evenly upon the spool.

As shown best in Figs. 2, 3, and 4, the shield extends between the head plates to lie intermediately of the spool and traversing shafts, one edge of the shield being outwardly turned to partially overlie the carriage for the better protection thereof.

Of particular importance to this invention is the relationship of the two guide bars to the traversing shaft and to the carriage wherein is mounted the pawl. It will be noted that the pawl axis intersects that of the traversing shaft in a perpendicular relation. This relationship is assured throughout the life of the reel by reason of the pawl being mounted between the guides in what may be termed a neutral position, in that the pawl is coincident with the axis of any endwise rocking movement which may develop in the carriage. No matter what materials are used for the wearing parts, it commonly results that, after long periods of usage, the interengaging surfaces of the carriage and traversing shaft become worn, whereby the carriage tends to rock or incline slightly in the direction of its travel along the traversing shaft. With the usual reel constructions, such rocking movement of the carriage also causes the pawl axis to be shifted from a relationship which is perpendicular to that of the traversing shaft. Any such deviation, however slight, is apt to cause trouble at the moment when the pawl oscillates in its mounting to align with an oppositely pitched traversing shaft thread, the result being that a jamming of the parts may occur such as to impair the operation of the carriage.

The contingencies just mentioned are impossible of occurrence in a reel constructed according to this invention, since the pawl is rotatably mounted in a neutral position relative to the traversing shaft; that is, the axis of any carriage rocking movement is coincident with the pawl axis and hence cannot disturb the alignment of the latter with reference to the traversing shaft threads. This relationship is effective through the use of two guide bars located parallel to and equidistantly from the traversing shaft, and preferably to one side of its axis as distinguished from a position on diametrically opposite sides thereof. Although the carriage may, with usage, rock slightly, the perpendicular relationship of the pawl axis to that of the traversing shaft will remain undisturbed, with the consequence that the pawl remains just as free as ever to align with the oppositely pitched threads of the traversing shaft. In addition, the assembly of the carriage upon its mountings suffices to maintain the pawl in operative relation with its associated parts, and it is only by disassembling these parts that the pawl can disengage from the carriage or from the traversing shaft.

I claim:

1. In a fishing reel, the combination of a spool shaft, a carriage adapted for reciprocation lengthwise thereof, a traversing shaft extended adjacent the carriage, guiding means for the carriage adapted to maintain the same against rotation, a shield extending between the spool and traversing shafts and disposed adjacent the carriage in a manner to partly overlie the same, and a driving connection between the traversing shaft and the carriage, said connection extending from the carriage at a point which is neutral in relation to the guiding means, substantially as described.

2. In a fishing reel, the combination of a spool shaft, a carriage adapted for reciprocation lengthwise thereof, a traversing shaft extended adjacent the carriage, a pair of guiding means extended through the carriage body in a manner to permit of sliding movement of the carriage thereupon, a shield extending between the spool and traversing shafts and disposed adjacent the carriage and guiding means in a manner to partly overlie the same, and a connection extending from the traversing shaft to a point in the carriage which is neutral in relation to the guiding means, said connection being adapted to transform rotary movements of the shaft to reciprocatory movements of the carriage, substantially as described.

3. In a fishing reel, the combination of a spool shaft, a carriage adapted for reciprocation lengthwise thereof, a traversing shaft extended adjacent the carriage, a pair of guiding means extended through the carriage body in a manner to permit the carriage to slide thereupon, said guiding means being located equidistantly from the traversing shaft to one side thereof, a shield extending between the spool and traversing shafts and disposed adjacent the carriage and guiding means to partially overlie the same, and a pawl engaged with the traversing shaft having a mounting in the carriage at a point which is neutral in relation to the guiding means therefor, substantially as described.

4. In a fishing reel, the combination of a carriage having two parallel holes extended through its body, a pair of guide rods extending through the holes and providing a guide whereon the carriage may freely slide, there being also a socket extending into the carriage from one side thereof equidistantly from the two guides, a pawl disposed partly within the socket, means providing a combined retainer for the pawl and a propeller for the carriage consisting of a reversely threaded traversing shaft arranged to one side of the carriage in operative relation to the pawl therein, and a shield extending lengthwise of the traversing shaft and partially overlying the carriage and guiding means therefor, substantially as described.

JACK T. WELCH.

Witness:
L. J. WOOSTER.